US012561961B2

(12) United States Patent
Ma et al.

(10) Patent No.: US 12,561,961 B2
(45) Date of Patent: Feb. 24, 2026

(54) MULTIMODAL WEAKLY-SUPERVISED THREE-DIMENSIONAL (3D) OBJECT DETECTION METHOD AND SYSTEM, AND DEVICE

(71) Applicant: University of Science and Technology Beijing, Beijing (CN)

(72) Inventors: Huimin Ma, Beijing (CN); Haizhuang Liu, Beijing (CN); Yilin Wang, Beijing (CN); Rongquan Wang, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 421 days.

(21) Appl. No.: 18/130,200

(22) Filed: Apr. 3, 2023

(65) Prior Publication Data

US 2024/0161478 A1 May 16, 2024

(30) Foreign Application Priority Data

Nov. 16, 2022 (CN) .......................... 202211435079.1

(51) Int. Cl.
*G06V 10/80* (2022.01)
*G06T 5/70* (2024.01)
(Continued)

(52) U.S. Cl.
CPC .............. *G06V 10/803* (2022.01); *G06T 5/70* (2024.01); *G06T 7/73* (2017.01); *G06V 10/7715* (2022.01);
(Continued)

(58) Field of Classification Search
CPC .... G06V 10/803; G06V 10/806; G06V 20/58; G06V 10/80; G06T 7/73
See application file for complete search history.

(56) References Cited

U.S. PATENT DOCUMENTS

2020/0160559 A1* 5/2020 Urtasun ................. G06V 10/82
2023/0071437 A1* 3/2023 Kim ........................ G01S 17/89

OTHER PUBLICATIONS

Haizhuang Liu, Huimin Ma, Yilin Wang, Bochao Zou, Tianyu Hu, Rongquan Wang, and Jiansheng Chen. 2022. Eliminating Spatial Ambiguity for Weakly Supervised 3D Object Detection without Spatial Labels. In Proceedings of the 30th ACM International Conference on Multimedia (MM '22) .= (Year: 2022).*

(Continued)

*Primary Examiner* — Utpal D Shah
*Assistant Examiner* — Jack Peter Kraynak
(74) *Attorney, Agent, or Firm* — Kirk A. Wilson; Joseph T. Guy; Patent Filing Specialist Inc.

(57) ABSTRACT

Disclosed are a multimodal weakly-supervised three-dimensional (3D) object detection method and system, and a device. The method includes: shooting multiple two-dimensional (2D) red, green and blue (RGB) images with a camera, acquiring ground points by a vehicle LiDAR sensor and generating a 3D frustum based on 2D box labels on each of the 2D RGB images; filtering ground points in the 3D frustum and selecting a region with most 3D points; generating a 3D pseudo-labeling bounding box of an object according to the region with the most 3D points; training a multimodal superpixel dual-branch network with the 3D pseudo-labeling bounding boxes as labels and the 2D RGB image and the 3D point cloud as inputs; and inputting a 2D RGB image of a current frame and a 3D point cloud of a current scenario to a trained multimodal superpixel dual-branch network to generate an overall 3D point cloud.

9 Claims, 2 Drawing Sheets

(51) Int. Cl.

| | |
|---|---|
| *G06T 7/73* | (2017.01) |
| *G06V 10/77* | (2022.01) |
| *G06V 10/774* | (2022.01) |
| *G06V 20/58* | (2022.01) |
| *G06V 20/64* | (2022.01) |

(52) U.S. Cl.
CPC .......... *G06V 10/774* (2022.01); *G06V 10/806* (2022.01); *G06V 20/58* (2022.01); *G06V 20/64* (2022.01); *G06T 2207/10024* (2013.01); *G06T 2207/10028* (2013.01); *G06T 2207/20021* (2013.01); *G06T 2207/20081* (2013.01); *G06T 2207/30196* (2013.01); *G06T 2207/30252* (2013.01)

(56) References Cited

OTHER PUBLICATIONS

Y. Wei, S. Su, J. Lu and J. Zhou, "FGR: Frustum-Aware Geometric Reasoning for Weakly Supervised 3D Vehicle Detection," 2021 IEEE International Conference on Robotics and Automation (ICRA), Xi'an, China, 2021, pp. 4348-4354, doi: 10.1109/ICRA48506.2021.9561245 (Year: 2021).*

Sun, T., Zhang, Z., Tan, X., Qu, Y., Xie, Y., & Ma, L. (2022). Image Understands Point Cloud: Weakly Supervised 3D Semantic Segmentation via Association Learning. IEEE Transactions on Image Processing, 33, 1838-1852. (Year: 2022).*

Wilson, B., Kira, Z., & Hays, J. (2020). 3d for free: Crossmodal transfer learning using hd maps. arXiv preprint arXiv:2008.10592. (Year: 2020).*

M. Zhu, C. Ma, P. Ji and X. Yang, "Cross-Modality 3D Object Detection," 2021 IEEE Winter Conference on Applications of Computer Vision (WACV), Waikoloa, HI, USA, 2021, pp. 3771-3780, doi: 10.1109/WACV48630.2021.00382. (Year: 2021).*

M. Liang, B. Yang, S. Wang, and R. Urtasun, "Deep continuous fusion for multi-sensor 3D object detection," in Proc. Eur. Conf. Comput. Vis. (ECCV), Sep. 2018, pp. 641-656: (Year: 2018).*

Y. Cui et al., "Deep Learning for Image and Point Cloud Fusion in Autonomous Driving: A Review," in IEEE Transactions on Intelligent Transportation Systems, vol. 23, No. 2, pp. 722-739, Feb. 2022, doi: 10.1109/TITS.2020.3023541. (Year: 2022).*

* cited by examiner

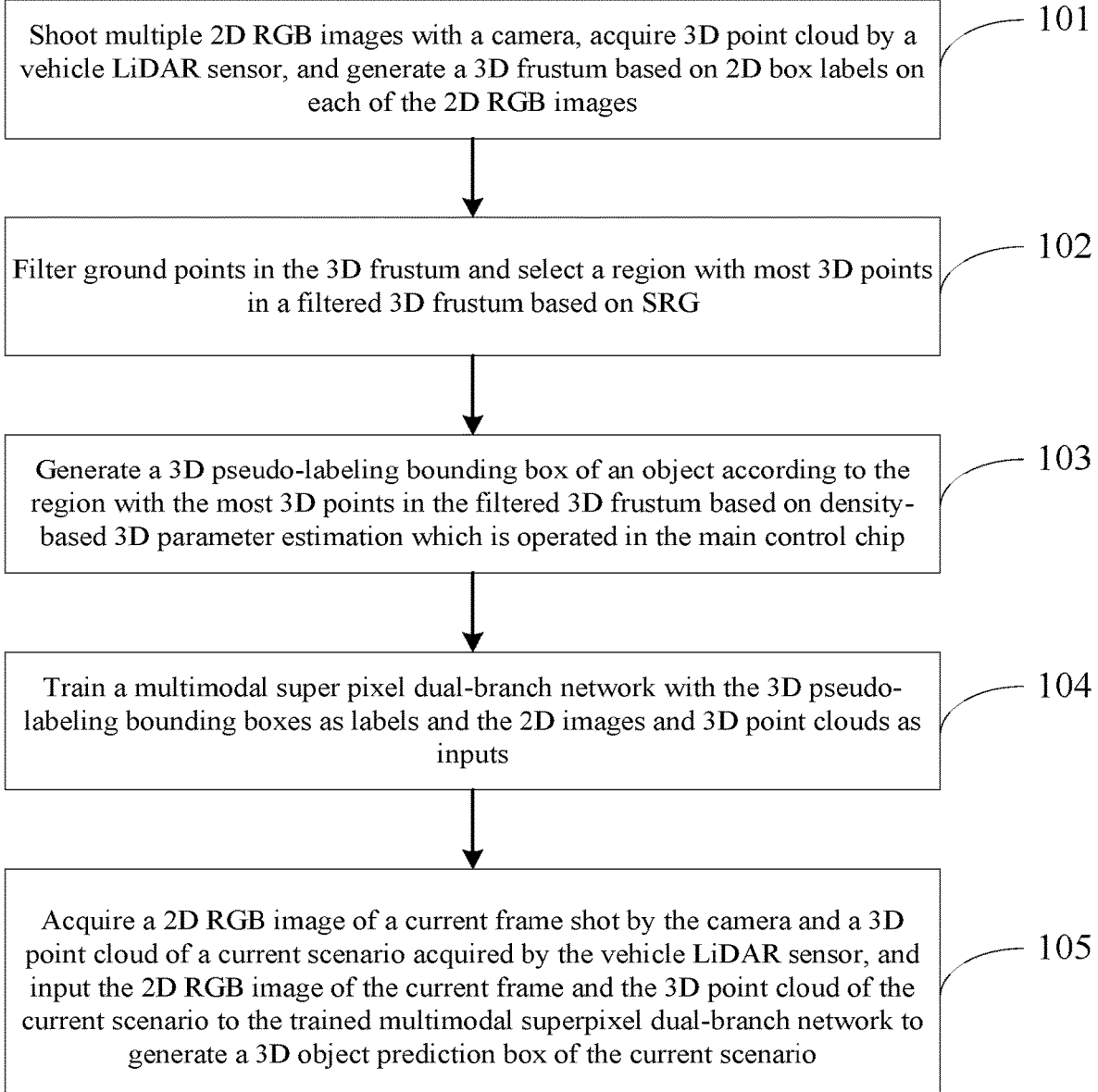

Shoot multiple 2D RGB images with a camera, acquire 3D point cloud by a vehicle LiDAR sensor, and generate a 3D frustum based on 2D box labels on each of the 2D RGB images — 101

Filter ground points in the 3D frustum and select a region with most 3D points in a filtered 3D frustum based on SRG — 102

Generate a 3D pseudo-labeling bounding box of an object according to the region with the most 3D points in the filtered 3D frustum based on density-based 3D parameter estimation which is operated in the main control chip — 103

Train a multimodal super pixel dual-branch network with the 3D pseudo-labeling bounding boxes as labels and the 2D images and 3D point clouds as inputs — 104

Acquire a 2D RGB image of a current frame shot by the camera and a 3D point cloud of a current scenario acquired by the vehicle LiDAR sensor, and input the 2D RGB image of the current frame and the 3D point cloud of the current scenario to the trained multimodal superpixel dual-branch network to generate a 3D object prediction box of the current scenario — 105

FIG. 1

MULTIMODAL WEAKLY-SUPERVISED THREE-DIMENSIONAL (3D) OBJECT DETECTION METHOD AND SYSTEM, AND DEVICE

CROSS REFERENCE TO RELATED APPLICATION

This patent application claims the benefit and priority of Chinese Patent Application No. 202211435079.1, filed with the China National Intellectual Property Administration on Nov. 16, 2022, the disclosure of which is incorporated by reference herein in its entirety as part of the present application.

TECHNICAL FIELD

The present disclosure relates to the field of autonomous driving, and in particular to a multimodal weakly-supervised three-dimensional (3D) object detection method and system, and a device.

BACKGROUND

With rapid development of deep learning in recent years, strong supervision information is required for networks. As an important task in the fields of autonomous driving and robots, 3D object detection has attracted attentions of researchers. Fully-supervised 3D object detection has onerous manual operations, since its accuracy depends on a manually labeled 3D bounding box.

Existing weakly-supervised 3D object detection is mainly intended for vehicles. However, on real roads, there are further pedestrians, cyclists and so on besides the vehicles. There still lacks research on objects with undefined outer edges such as the pedestrians and cyclists. For the pedestrians and cyclists, the difficulties lie in:

1) 3D parameters are estimated hardly: The vehicles have an evident 3D outer edge, a relatively larger size, and a large number of instances in a dataset, and thus their 3D parameters (3D positions, 3D sizes and orientations) can be speculated easily. 3D points of the pedestrians and cyclists are dense in a center but sparse at two sides. In a bird's eye view (BEV), bounding boxes of the pedestrians and cyclists cannot be found by frustum-aware geometric reasoning (FGR), in which angular points are speculated directly and deleted sequentially.

2) The points of the pedestrians and cyclists are less than those of the vehicles, which is prone to overfitting in a single modality to cause insufficient generalization.

3) The 3D objects are localized with multimodal features. Nevertheless, singly splicing color information or two-dimensional (2D) and high-dimensional features of 3D projection points cannot make full use of the multimodal features. Existing multimodal fusion methods often use cascaded fusion or point-wise feature fusion. The cascaded fusion methods have an error accumulation problem, which is manifested in that objects not detected in a previous modality still cannot be detected in a later modality. The point-wise feature fusion fuses features at a network level, and avoids the error accumulation problem. Unfortunately, resolutions in 2D and 3D imaging are different, such that the multimodal information cannot be used fully.

SUMMARY

An objective of the present disclosure is to provide a multimodal weakly-supervised 3D object detection method and system, and a device, to solve problems that information densities in 2D and 3D modalities cannot be aligned, and multimodal information cannot be fully used to identify and localize a 3D object.

To achieve the above objective, the present invention provides the following technical solutions:

The present disclosure provides a multimodal weakly-supervised 3D object detection method, including:

shooting multiple 2D red, green and blue (RGB) images with a camera, acquiring 3D point cloud by a vehicle LiDAR sensor, and generating a 3D frustum in 3D point cloud based on 2D labels on each of the 2D RGB images;

filtering ground points in the 3D frustum, and selecting a region with most 3D points in seeded region growing (SRG);

generating a 3D pseudo-labeling bounding box of an object according to the region with the most 3D points in the filtered 3D frustum based on density-based 3D parameter estimation, which is operated in a main control chip, the object being a pedestrian or a cyclist;

training a multimodal superpixel dual-branch network with the 3D pseudo-labeling bounding boxes as labels and the 2D RGB image and the 3D point cloud as inputs in the main control chip, where the 2D RGB image and the 3D point cloud are input to the network, the network outputs a 3D object prediction bounding box of the object, and the 3D object prediction bounding box is configured to localize the object around a vehicle, and estimate a size and an orientation of the object; and acquiring a 2D RGB image of a current frame shot by the camera and a 3D point cloud of a current scenario acquired by the vehicle LiDAR sensor, and inputting the 2D RGB image of the current frame and the 3D point cloud of the current scenario to the trained multimodal superpixel dual-branch network to generate a 3D object prediction bounding box of the current scenario, where the 3D object prediction bounding box is configured to localize the object around the vehicle, and predict a size and an orientation of the object around the current vehicle.

Optionally, the generating a 3D pseudo-labeling bounding box of an object according to the region with the most 3D points in the filtered 3D frustum based on density-based 3D parameter estimation, which is operated in a main control chip specifically includes:

filtering an adhesive noise point cloud in the region with the most 3D points to generate a filtered 3D point cloud;

iteratively searching a BEV rotating box of the filtered 3D point cloud, progressively deleting a minimum point cloud density in the filtered 3D point cloud, and exiting iteration until a position of a key point is kept unchanged, thereby generating the BEV rotating box of the filtered 3D point cloud, where the key point is an angular point including most 3D points among four angular points of the rotating box; and expanding the key point to two sides of the filtered 3D frustum, constricting an expansion length with statistical information of the object, and generating the 3D pseudo-labeling bounding box with a vector direction of a long side as an orientation of the object.

Optionally, the training a multimodal superpixel dual-branch network with the 3D pseudo-labeling bounding boxes as labels and 2D RGB image and the 3D point cloud as inputs for generating a trained multimodal superpixel dual-branch network specifically includes:

corresponding 2D local pixel blocks to 3D points spatially with a local consistency priori that local neighboring regions in 2D images with similar color and texture are probably adjacent in 3D space to generate a projection relationship;

extracting an image feature map of the 2D RGB image with ResNet50, and upsampling the image feature map to the same size of an input image, the input image being the 2D RGB image;

performing superpixel segmentation on the input image, and obtaining superpixel features by pooling image feature map according to a superpixel segmentation result;

assigning the superpixel features to the 3D points according to the projection relationship;

applying separately 3D convolution for point cloud with initial geometric features and point cloud with superpixel features, and projecting the point cloud features to BEV generating a BEV feature map;

fusing BEV feature map generated by initial point cloud feature and superpixel features to obtain a fused feature; and training the multimodal superpixel dual-branch network with the fused feature as an object classification feature to generate the trained multimodal superpixel dual-branch network.

Optionally, the multimodal weakly-supervised 3D object detection method further includes:

training the multimodal superpixel dual-branch network by randomly abandoning the superpixel features, and padding abandoned superpixel features with 0.

The present disclosure provides a multimodal weakly-supervised 3D object detection system, including:

a 3D frustum generation module configured to shoot multiple 2D RGB images with a camera, acquire 3D point cloud by a vehicle LiDAR sensor, and generate a 3D frustum based on 2D box labels on each of the 2D RGB images;

a filtration module configured to filter ground points in the 3D frustum, and select a region with most 3D points in a filtered 3D frustum based on SRG;

a 3D pseudo-labeling bounding box generation module configured to generate a 3D pseudo-labeling bounding box of an object according to the region with the most 3D points in the filtered 3D frustum based on density-based 3D parameter estimation, which is operated in the main control chip, the object being a pedestrian or a cyclist;

a training module configured to train a multimodal superpixel dual-branch network with the 3D pseudo-labeling bounding boxes as labels and 2D RGB image and the 3D point cloud as inputs in the main control chip; and a detection module configured to acquire a 2D RGB image of a current frame shot by the camera and a 3D point cloud of a current scenario acquired by the vehicle LiDAR sensor, and input the 2D RGB image of the current frame and the 3D point cloud of the current scenario to the trained multimodal superpixel dual-branch network to generate a 3D object prediction bounding box of the current scenario, where the 3D object prediction bounding box is configured to localize the object around a vehicle, and predict a size and an orientation of the object around the current vehicle.

Optionally, the 3D pseudo-labeling bounding box generation module specifically includes:

a filtration unit configured to filter an adhesive noise point cloud in the region with the most 3D points to generate a filtered 3D point cloud;

a BEV rotating box generation unit configured to iteratively search a BEV rotating box of the filtered 3D point cloud, progressively delete a minimum point cloud density in the filtered 3D point cloud, and exit iteration until a position of a key point is kept unchanged, thereby generating the BEV rotating box of the filtered 3D point cloud, where the key point is an angular point including most 3D points among four angular points of the rotating box; and a 3D pseudo-labeling bounding box generation unit configured to expand the key point to two sides of the filtered 3D frustum, constrict an expansion length with statistical information of the object, and generate the 3D pseudo-labeling bounding box with a vector direction of a long side as an orientation of the object.

Optionally, the training module specifically includes:

a projection relationship generation unit configured to correspond 2D local pixel blocks to 3D points spatially with a local consistency priori to generate a projection relationship;

an upsampling unit configured to extract an image feature map of the 2D RGB image with ResNet50, and upsample the image feature map to the same size of an input image, the input image being the 2D RGB image;

a superpixel feature obtaining unit configured to perform superpixel segmentation on the input image, and obtain superpixel features on the image feature map according to a superpixel segmentation result;

an assignment unit configured to assign the superpixel features to the 3D points according to the projection relationship;

a projection unit configured to apply separately 3D convolution for point cloud with initial geometric features and point cloud with superpixel features, and project the point cloud features to BEV generating a BEV feature map;

a fused feature generation unit configured to fuse BEV feature map generated by initial geometric features and superpixel features obtaining a fused feature; and a trained multimodal superpixel dual-branch network generation unit configured to train the multimodal superpixel dual-branch network with the fused feature as an object classification feature to generate the trained multimodal superpixel dual-branch network.

Optionally, the multimodal weakly-supervised 3D object detection system further includes:

a random superpixel feature abandonment module configured to train the multimodal superpixel dual-branch network by randomly abandoning the superpixel features, and pad abandoned superpixel features with 0.

The present disclosure provides an electronic device, including a memory and a processor, where the memory is configured to store a computer program, and the processor runs the computer program to enable the electronic device to execute the foregoing multimodal weakly-supervised 3D object detection method.

The present disclosure provides a computer-readable storage medium, where the computer-readable storage medium stores a computer program, and the computer program is executed by a processor to implement the foregoing multimodal weakly-supervised 3D object detection method.

According to the specific embodiments of the present disclosure, the present disclosure achieves the following technical effects: According to the multimodal weakly-supervised 3D object detection method and system, and the device provided by the present disclosure, 3D points of the pedestrian and the cyclist are dense in a center but sparse at two sides. With the density-based 3D parameter estimation, the present disclosure effectively filters the noise points in the point cloud, and accurately predicts the 3D parameters of the object, thereby forming the 3D pseudo-labeling bounding box. The 3D pseudo-labeling bounding box does not depend on a specific network structure. The present disclosure improves the accuracy from the pseudo-labeling, so any network can be adopted for training. In addition, due to a small number of training samples for the pedestrian and the cyclist, overfitting is caused easily in a single modality. In order to prevent the network from overfitting to the single modality to cause insufficient generalization performance, the present disclosure uses the superpixel dual-branch network with similar underlying color and texture, and assigns semantically similar 2D superpixel features to the 3D points under an assumption of local consistency, thereby aligning information densities in 2D and 3D modalities, and making full use of multimodal information to identify and localize the 3D object.

BRIEF DESCRIPTION OF THE DRAWINGS

To describe the technical solutions in the examples of the present disclosure or in the prior art more clearly, the accompanying drawings required for the examples are briefly described below. Apparently, the accompanying drawings in the following description show merely some examples of the present disclosure, and those of ordinary skill in the art may still derive other accompanying drawings from these accompanying drawings without creative efforts.

FIG. 1 is a flowchart of a multimodal weakly-supervised 3D object detection method according to the present disclosure.

DETAILED DESCRIPTION OF THE EMBODIMENTS

Figure 2:
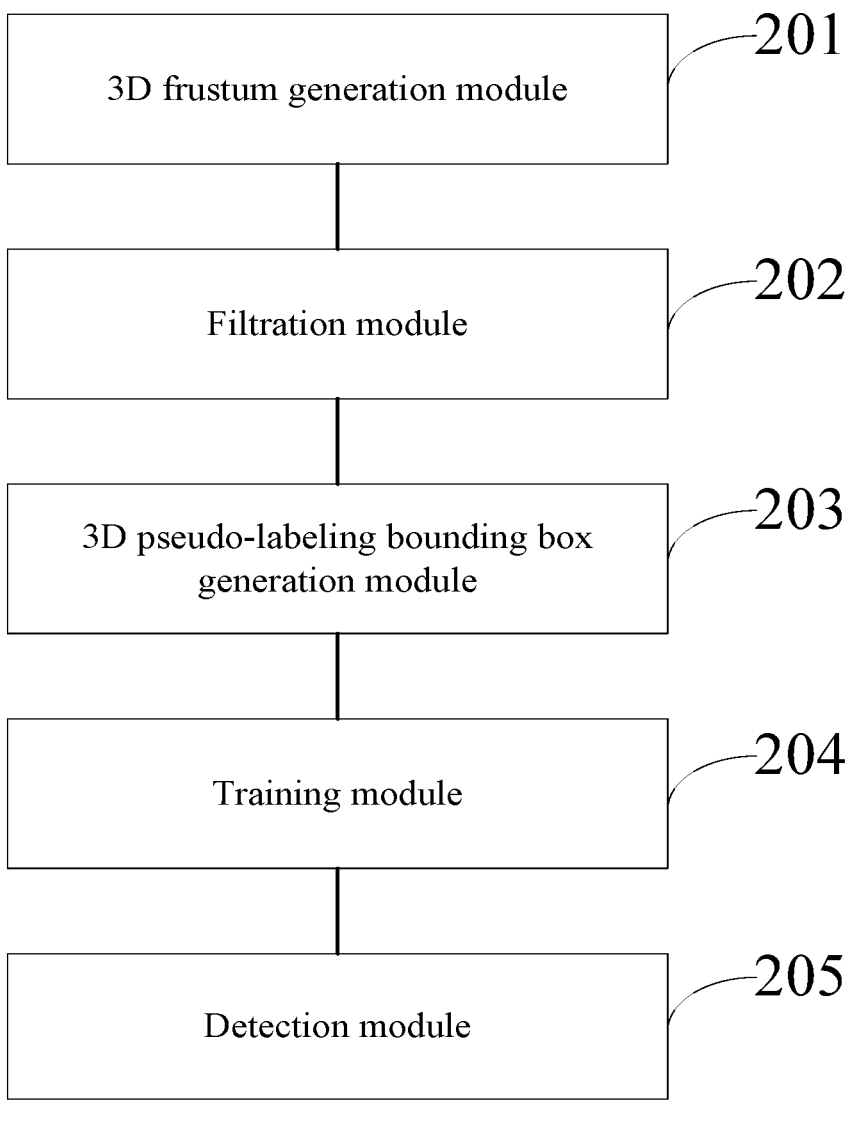
FIG. 2 is a structural view of a multimodal weakly-supervised 3D object detection system according to the present disclosure.

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a multimodal weakly-supervised 3D object detection method and system, and a device, to relieve unmatched resolutions in 2D and 3D modalities, and make full use of multimodal information to identify and localize a 3D object.

To make the above objectives, features, and advantages of the present disclosure clearer and more comprehensible, the present disclosure will be further described in detail below with reference to the accompanying drawings and the specific examples.

Objects such as pedestrians and cyclists still have the following two problems: Due to small sizes, they are prone to an adhesion phenomenon of background points after coarse segmentation. Because of no evident bounding box, point clouds of the pedestrians and cyclists are mainly distributed in centers, with few point clouds at edges of BEV rotating boxes. Hence, the assumption of a high point cloud density at an angular point is not untenable, and directly obtaining a minimum bounding box will cause a poor accuracy.

Embodiment 1

The present disclosure provides a multimodal weakly-supervised 3D object detection method. FIG. 1 is a flowchart of a multimodal weakly-supervised 3D object detection method according to the present disclosure. As shown in FIG. 1, the multimodal weakly-supervised 3D object detection method includes the following steps:

Step 101: Shoot multiple 2D RGB images with a camera, acquire 3D point cloud by a vehicle LiDAR sensor, and generate a 3D frustum based on 2D boxes labels in each of the 2D RGB images.

Step 102: Filter ground points in the 3D frustum, and select a region with most 3D points in a filtered 3D frustum based on SRG.

Step 103: Generate a 3D pseudo-labeling bounding box of an object according to the region with the most 3D points in the filtered 3D frustum based on density-based 3D parameter estimation, which is operated in a main control chip, the object being a pedestrian or a cyclist.

In actual applications, Step 103 specifically includes: Filter an adhesive noise point cloud in the region with the most 3D points to generate a filtered 3D point cloud; iteratively search a BEV rotating box of the filtered 3D point cloud, progressively delete a point with minimum density in the filtered 3D point cloud, and exit iteration until a position of a key point is kept unchanged, thereby generating the BEV rotating box of the filtered 3D point cloud, where the key point is an angular point including most 3D points among four angular points of the rotating box; and expand the key point to two sides of the filtered 3D frustum, constrict an expansion length with statistical information of the object, and generate the 3D pseudo-labeling bounding box with a vector direction of a long side as an orientation of the object.

In actual applications, the 3D pseudo-labeling bounding box is generated as follows:

The adhesive noise point cloud in a generated seed region is filtered. The point cloud density is defined as:

$$d_p = \cfrac{1}{\cfrac{1}{K}\sum_{i=1}^{K}(\|p - p_i\|_2)} \tag{1}$$

In Eq. (1), $d_p$ is a density of a point p, $p_i$ is a point in a K-nearest neighbor of the point p, K is a number of nearest neighbors in a K-nearest neighbor algorithm, i is an index number, N is a total number of points in the region, and $d_p$ uses a point-to-point distance to represent a point density. The portion with a higher density has a smaller point-to-point distance and a larger reciprocal.

The density center is defined as:

$$p_c = \frac{\sum\limits_{i=1}^{N}d_i p_i}{\sum\limits_{i=1}^{N}d_i} \tag{2}$$

The accurate labels of the 2D box are provided in Step 101. In the frustum generated by the 2D box, points on the main body of the object are dense, while background points are sparse. Herein, the background points are estimated on the ground, and the ground points are filtered.

In Eq. (2), $p_c$ is a point cloud density based center, and $d_i$ is a point cloud density of the point $p_i$ calculated by Eq. (1).

The filtering equation is defined as:

$$M_i = \begin{cases} 0 & \|p_i - p_c\|_2 \le T_c \text{ or } d_i \ge \overline{d} - \dfrac{\sigma_d}{2} \\ 1 & \text{other} \end{cases} \tag{3}$$

In Eq. (3), M is a mask matrix of a point set P, $M_i$ is used to indicate whether to retain the point $p_i$, 0 representing no, and 1 representing yes, $p_c$ is an object center calculated from Eq. (2) and speculated based on the point cloud density, $T_c$ is a distance threshold of the object center, $d_i$ is a density of the point $p_i$, $\overline{d}$ is an average of the point density, and $\sigma_d$ is a standard deviation of the point density. In point cloud imaging, there are some points that belong to the object but are far from remaining points. With single use of density-based filtration, these points may be deleted mistakenly. Hence, the distance toward the density center of the object is limited in Eq. (3).

Noise in the point cloud is filtered according to Eq. (3). Any point is retained if the value is 1, or filtered if the value is 0.

Based on first filtration, the BEV rotating box of the point cloud is searched. For estimation of 3D parameters of the pedestrians and cyclists, a new parameter estimation process is designed according to morphological features of the pedestrians and cyclists. The pedestrians and cyclists morphologically appear as an ellipse in the BEV. In Step 102, elliptical parameter fitting is performed on the filtered point cloud, and an eccentricity $\theta$ of the ellipse, namely an angle of intersection between a long axis of the ellipse and an x axis in a coordinate system xOz, is calculated. An angle is searched in the interval $[\theta+T_\theta, \theta-T_\theta]$ with an objective function in Eq. (4). The initial angle obtained with the eccentricity of the ellipse limits the search interval and accelerates the search to some extent. On the other hand, the limitation on the search interval prevents falling into local optimum.

$$f = \frac{|Q_0|}{|Q|} + \alpha(1 - \text{area}) \tag{4}$$

$$Q_0 = \{p|p \in Q, \|p, l_1\| > T_{rect}, \|p, l_2\| > T_{rect}\}$$

In Eq. (4), $Q_0$ is a subset to Q satisfying a distance limit, l is an edge, $T_{rect}$ is a distance threshold, area is an area of a rotating box to be searched, and $\alpha$ is a balance factor. The term $$\frac{|Q_0|}{|Q|}$$

is used to prevent the object from getting close to the angular point of the box, and the term area is used to keep a degree of attachment of the rotating box in the search.

The rotating box is searched iteratively. Intensive noise points are removed progressively. For the pedestrians and cyclists, the portion with the low point cloud density is viewed as noise points for removal. Iteration is exited when the position of the key point is basically unchanged. The key point is an angular point including most points among four angular points of the rotating box.

The portion with the highest point density in the angular points is searched as the key point. The key point is expanded toward two sides of the frustum. The expansion length is constricted by statistical information of the object. At last, the 3D pseudo-labeling bounding box is generated with the vector direction of the long side as an orientation of the object.

The noise points are deleted with the point cloud density, which mainly lies in that the rotating box can get close to the object center. The actual orientation of the angular point of the object is hardly estimated, and thus is simplified as expansion from the central rotating box to the frustum.

3D points of the pedestrians and the cyclists are dense in the center but sparse at two sides.

With the density-based 3D parameter estimation, the present disclosure can effectively filter the noise points in the point cloud, and accurately predict the 3D parameters of the object, thereby forming the 3D pseudo-labeling bounding box. The 3D pseudo-labeling bounding box does not depend on a network structure. The present disclosure improves the accuracy from the pseudo-labeling, so any network can be adopted for training.

In the subsequent step, a multimodal superpixel dual-branch network is trained according to the 3D pseudo-labeling bounding box generated in Step 103. The 3D pseudo-labeling bounding box serves as a training label in Step 104. In Step 104, a 2D RGB image of a current frame and an overall 3D point cloud acquired by the vehicle LiDAR sensor are to be input.

Step 104: Train a multimodal superpixel dual-branch network with the 3D pseudo-labeling bounding boxes as labels and the 2D RGB image and the 3D point cloud as inputs.

Step 104 specifically includes: Correspond 2D local pixel blocks to 3D points spatially with a local consistency priori to generate a projection relationship; extract an image feature map of the 2D RGB image with ResNet50, and upsample the image feature map to the same size of an input image, the input image being the 2D RGB image; perform superpixel segmentation on the input image, and obtain superpixel features by pooling on the image feature map according to the superpixel segmentation result; assign the superpixel features to the 3D points according to the projection relationship; apply separately 3D convolution for 3D point cloud with initial geometric features and 3D point cloud with superpixel features, and project the 3D point cloud features to BEV generating a BEV feature map; fuse 3D point cloud features in the BEV feature map generated by the initial geometric feature and superpixel features to obtain a fused feature; and train the multimodal superpixel dual-branch network with the fused feature as an object classification feature.

In actual application, two aspects are to be considered in modal fusion.

First: The numbers of points of 2D and 3D modalities are different in a same scenario, so how to align 2D and 3D data is to be considered.

Second: The network structure in the modal fusion needs to be designed carefully. Concerning alignment between the 2D and 3D data, methods such as PointPainting are to directly splice attributes of 2D images to 3D projection points. For the sake of a higher accuracy, time-consuming segmentation and labeling are introduced. Methods such as Multimodal VoxelNet (MVX-net) use point-wise alignment and are to extract features of 3D projection points on a 2D feature map. Unfortunately, amounts of 2D and 3D information are not aligned.

The present disclosure proposes to align 2D data and 3D data semantically, and corresponds the 2D local pixel blocks to the 3D points spatially with the local consistency priori. Superpixels have an effect of aggregating 2D points with underlying colors and texture information. Therefore, based on the projection relationship, the 3D points correspond to a point set composed of superpixels on the 2D image. In addition, extra labeling effort is not introduced.

Specifically, an image feature map is extracted with ResNet50. The image feature map is upsampled to the same size of an input image. Superpixel segmentation is performed on the input image. Superpixel features are obtained by pooling the image feature map according to a superpixel segmentation result. Herein, average pooling is used to extract the superpixel features. The superpixel features are assigned to 3D points according to the projection relationship (the 3D points refer to a point cloud of an overall scenario scanned by the vehicle LiDAR sensor). If any 3D point falls within a superpixel range, the superpixel feature is assigned to the 3D point.

Since separation of the class feature and the size feature of the object can effectively improve the accuracy of the network, the present disclosure adopts a dual-branched structure to separate features for classification and regression.

The initial point cloud feature is extracted with the 3D convolution. After the superpixel features are assigned to the 3D point cloud, point cloud features of the 3D points having the superpixel features are extracted with the 3D convolution. The point cloud features of the 3D points having the superpixel features are projected to a BEV and fused with a point cloud feature (which is a high-dimensional vector extracted with the 3D convolution after voxelization) to generate a fused feature. Since classification of the object depends on the appearance in the 2D image and the shape in the 3D point cloud, the fused feature is used as a feature to classify the object.

The point cloud contains more accurate localization information. During training of the network, 3D data is augmented. In order to allow the network to learn features of the 2D image for size regression, it is very hard to keep 2D image and 3D point cloud consistent. Hence, only the point cloud features are used to regress 3D parameters of the object.

The multimodal superpixel multi-branch network for localizing the pedestrian or the cyclist can effectively solve the problem of poor performance of the existing single modality, and can be used in the field of automatic driving to perceive scenarios.

When the multimodal network structure is used, the training strategy is still to be considered. In order to enhance generalization performance of the network, data augmentation, such as random rotation, random translation, random scaling and random replication, is added in training of a 3D object detector. However, these methods will damage consistency between the 2D image and the 3D point cloud, and possibly make the 2D image and the 3D point cloud semantically inconsistent. To keep multimodal data consistent, the superpixel features are randomly abandoned by the network at a certain probability in the training, and are padded with 0. In object replication, the superpixel features of the newly replicated object are padded with 0.

Step 105: Acquire a 2D RGB image of a current frame shot by the camera and a 3D point cloud of a current scenario acquired by the vehicle LiDAR sensor, and input the 2D RGB image of the current frame and the 3D point cloud of the current scenario to the trained multimodal superpixel dual-branch network to generate a 3D object prediction bounding box of the current scenario, where the 3D object prediction bounding box is configured to localize the object around a vehicle, and predict a size and an orientation of the object around the current vehicle.

Due to a small number of training samples for the pedestrians and the cyclists, overfitting is caused easily in a single modality. In order to prevent the network from overfitting to the single modality to cause poor generalization performance, the present disclosure trains a weakly-supervised 3D object detector with multimodal fusion. Nevertheless, singly splicing 2D color information or high-dimensional features of 3D projection points cannot make full use of the multimodal features. The present disclosure uses the superpixel dual-branch network with similar underlying color and texture, and assigns semantically similar 2D superpixel features to the 3D points under an assumption of local consistency, thereby aligning information densities in 2D and 3D modalities, and making full use of multimodal information to identify and localize the 3D object.

The superpixel dual-branch network provided by the present disclosure does not depend on a special 3D network structure, and can be combined with most 3D network structures to form a novel multimodal fusion network. Compared with a method of keeping 2D and 3D consistent, the training method of randomly abandoning the superpixel features in the present disclosure ensures a certain accuracy, with a simpler strategy and an easy implementation.

Embodiment 2

In order to execute the corresponding method in Embodiment 1 to achieve the corresponding features and technical effects, a multimodal weakly-supervised 3D object detection system is provided below.

FIG. 2 is a structural view of a multimodal weakly-supervised 3D object detection system according to the present disclosure. As shown in FIG. 2, the multimodal weakly-supervised 3D object detection system includes: a 3D frustum generation module 201, a filtration module 202, a 3D pseudo-labeling bounding box generation module 203, a training module 204, and a detection module 205.

The 3D frustum generation module 201 is configured to shoot multiple 2D RGB images with a camera, acquire 3D point cloud by a vehicle LiDAR sensor, and generate a 3D frustum based on 2D box labels on each of the 2D RGB images.

The filtration module 202 is configured to filter ground points in the 3D frustum and select a region with most 3D points in a filtered 3D frustum based on SRG.

The 3D pseudo-labeling bounding box generation module 203 is configured to generate a 3D pseudo-labeling bounding box of an object according to the region with the most 3D points in the filtered 3D frustum. The generation process is operated in the main control chip based on density-based 3D parameter estimation. And the objects are pedestrians or cyclists.

The 3D pseudo-labeling bounding box generation module 203 specifically includes: a filtration unit configured to filter an adhesive noise point cloud in the region with the most 3D points to generate a filtered 3D point cloud; a BEV rotating box generation unit configured to iteratively search a BEV rotating box of the filtered 3D point cloud, progressively delete a point with minimum density in the filtered 3D point cloud, and exit iteration until a position of a key point is kept unchanged, thereby generating the BEV rotating box of the filtered 3D point cloud, where the key point is an angular point including most 3D points among four angular points of the rotating box; and a 3D pseudo-labeling bounding box generation unit configured to expand the key point to two sides of the filtered 3D frustum, constrict an expansion length with statistical information of the object, and generate the 3D pseudo-labeling bounding box with a vector direction of a long side as orientation of the object.

The training module 204 is configured to train a multimodal superpixel dual-branch network with the 3D pseudo-labeling bounding boxes as labels and the 2D RGB image and the 3D point cloud as inputs in the main control chip.

The training module 204 specifically includes: a projection relationship generation unit configured to correspond 2D local pixel blocks to 3D points spatially with a local consistency priori to generate a projection relationship; an upsampling unit configured to extract an image feature map of the 2D RGB image with ResNet50, and upsample the image feature map to the same size of an input image, the input image being the 2D RGB image; a superpixel feature obtaining unit configured to perform superpixel segmentation on the input image, and obtain superpixel features on the image feature map according to a superpixel segmentation result; an assignment unit configured to assign the superpixel features to the 3D points according to the projection relationship; a projection unit configured to apply separately 3D convolution for 3D point cloud with initial geometric features and 3D point cloud with superpixel features, and project the 3D point cloud features to BEV generating a BEV feature map; a fused feature generation unit configured to fuse point cloud features in the BEV feature map generated by the initial geometric feature and superpixel feature to generate a fused feature; and a trained multimodal superpixel dual-branch network generation unit configured to train the multimodal superpixel dual-branch network with the fused feature as an object classification feature to generate the trained multimodal superpixel dual-branch network.

The detection module 205 is configured to acquire a 2D RGB image of a current frame shot by the camera and a 3D point cloud of a current scenario acquired by the vehicle LiDAR sensor, and input the 2D RGB image of the current frame and the 3D point cloud of the current scenario to the trained multimodal superpixel dual-branch network to generate a 3D object prediction bounding box of the current scenario, where the 3D object prediction bounding box is configured to localize the object around a vehicle, and predict a size and an orientation of the object around the current vehicle.

The multimodal weakly-supervised 3D object detection system provided by the present disclosure further includes: a random superpixel feature abandonment module configured to train the multimodal superpixel dual-branch network by randomly abandoning the superpixel features, and pad abandoned superpixel features with 0.

In order to equilibrate features of 2D data and 3D data, the present disclosure aligns the 2D data and the 3D data semantically and spatially, thereby making full use of rich semantic information of the 2D image and a precise localization accuracy of the 3D point cloud. The present disclosure proposes the superpixel dual-branch network based on similar low-level color and texture features to align information densities in 2D and 3D modalities, and makes full use of multimodal information to identify and localize the 3D object.

Embodiment 3

The embodiment of the present disclosure provides an electronic device, including a memory and a processor, where the memory is configured to store a computer program, and the processor runs the computer program to enable the electronic device to execute the multimodal weakly-supervised 3D object detection method in Embodiment 1.

In actual applications, the electronic device may be a server.

In actual applications, the electronic device includes: at least one processor, a memory, a bus, and a communication interface.

The processor, the communication interface, and the memory communicate with each other through the bus.

The communication interface is configured to communicate with other devices.

The processor is configured to execute a program, and specifically execute the method in the foregoing embodiment.

Specifically, the program may include a program code. The program code includes a computer operation instruction.

The processor may be a central processing unit (CPU) or an application specific integrated circuit (ASIC), or configured as one or more integrated circuits to implement the embodiment of the present disclosure. The electronic device includes one or more processors, which may be a same type of processors, such as one or more CPUs, and may also be different types of processors, such as one or more CPUs and one or more ASICs.

The memory is configured to store a program. The memory may include a high-speed random access memory (RAM) memory, and may also include a non-volatile memory such as at least one disk memory.

Based on the above descriptions, the embodiment of the present disclosure provides a storage medium. The storage medium stores a computer program thereon. The program is executed by a processor to implement the method in any embodiment.

The multimodal weakly-supervised 3D object detection system provided by the embodiment of the present disclosure exists in various forms, including but not limited to:

(1) Mobile communication devices: Such devices have a mobile communication function, and focus on voice and data communication. Such terminals include: a smartphone (like iPhone), a multimedia phone, a functional phone, and a low-end phone.

(2) Ultra-mobile personal computer (UMPC) devices: Such devices belong to a scope of personal computers, have computing and processing functions, and are generally provided with a mobile Internet-surfing function. Such terminals include: a personal digital assistant (PDA), a mobile Internet device (MID), and a UMPC device, such as iPad.

(3) Portable entertainment devices: Such devices can display and play multimedia contents. Such devices include: an audio and video player (such as an iPod), a handheld game player, an electronic book, an intelligent toy and a portable vehicle navigation device.

(4) Other electronic devices with a data interaction function.

The specific embodiments of the subject matter have been disclosed. Other embodiments fall within the scope of the appended claims. In some cases, the actions described in the claims may be performed in sequences different from those in the embodiments and still achieve expected results. In addition, the processes depicted in the accompanying drawings do not necessarily require the specific orders or sequential orders shown for achieving the expected results. In some implementations, multitasking and parallel processing may be advantageous.

The system, apparatus, modules and units described in the foregoing embodiments may be specifically implemented by a computer chip or entity, or implemented by product with a specific function. One typical implementation device is the computer. Specifically, the computer may be, for example, a personal computer, a laptop computer, a cellular phone, a camera phone, a smartphone, a PDA, a media player, a navigation device, an E-mail device, a game console, a tablet computer, a wearable device or a combination thereof.

For ease of description, the foregoing apparatus is divided into various units based on functions for separate description. Certainly, functions of different units may be implemented in one or more pieces of software and/or hardware during implementation of the present disclosure. Those skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may be in a form of a computer program product that is implemented on one or more computer-usable storage media (including but not limited to a magnetic disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct a computer or another programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, the computing device includes one or more CPUs, an input/output (I/O) interface, a network interface and a memory.

The memory may include a non-persistent memory, a RAM and/or a non-volatile memory in computer-readable media, such as a read only memory (ROM) or a flash RAM. The memory is an example of computer-readable media.

The computer-readable media includes both persistent and non-persistent and removable and non-removable media, and storage of information may be implemented by any method or technology. The information may be computer-readable instructions, data structures, modules of programs, or other data. The machine-readable storage medium includes but is not limited to a phase change random access memory (PRAM), a static random access memory (SRAM), a dynamic random access memory (DRAM), an RAM of another type, an ROM, an electrically erasable programmable read-only memory (EEPROM), a flash memory or another memory technology, a compact disc read-only memory (CD-ROM), a digital versatile disc (DVD) or another optical memory, a cassette tape, a tape memory, a disk memory or another magnetic storage device or any other non-transmission medium. The storage medium can be configured to store information accessed by a computing device. The computer-readable media, as defined herein, excludes non-transitory computer-readable media, such as modulated data signals and carrier waves.

It should also be noted that the term "comprise", "include", or any other variant thereof is intended to encompass a non-exclusive inclusion, such that a process, method, product, or device that includes a series of elements includes not only those elements, but also other elements not explicitly listed, or elements that are inherent to such a process, method, product, or device. Without more restrictions, an element defined by the phrase "including a . . . " does not exclude the presence of another same element in a process, method, product, or device that includes the element.

Those skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may be in a form of a computer program product that is implemented on one or more computer-usable storage media (including but not limited to a magnetic disk memory, a CD-ROM, an optical memory, and the like) that include computer-usable program code.

The present disclosure may be described in general contexts of computer executable instructions executed by a computer, such as a program module. Generally, the program module includes a routine, a program, an object, a component, a data structure, and the like that perform specific tasks or implement specific abstract data types. The present disclosure may alternatively be practiced in a distributed computing environment in which a task is performed by a remote processing device connected through a communication network. In the distributed computing environment, the program module may be located in local and remote computer storage media including a storage device.

Each example of the present specification is described in a progressive manner, each example focuses on the difference from other examples, and the same and similar parts between the examples may refer to each other. Since the system disclosed in an example corresponds to the method disclosed in another example, the description is relatively simple, and reference can be made to the method description.

Specific examples are used herein to explain the principles and implementations of the present disclosure. The foregoing description of the examples is merely intended to help understand the method of the present disclosure and its core ideas; besides, various modifications may be made by those of ordinary skill in the art to specific implementations and the scope of application in accordance with the ideas of the present disclosure. In conclusion, the content of the present specification shall not be construed as limitations to the present disclosure.

What is claimed is:

1. A multimodal weakly-supervised three-dimensional (3D) object detection method, comprising:

shooting multiple two-dimensional (2D) red, green and blue (RGB) images with a camera, acquiring 3D points by a vehicle LiDAR sensor, and generating a 3D frustum based on 2D box labels on each of the 2D RGB images;

filtering ground points in the 3D frustum and selecting a region with most 3D points in a filtered 3D frustum based on seeded region growing (SRG);

generating a 3D pseudo-labeling bounding box of an object according to the region with the most 3D points in the filtered 3D frustum based on density-based 3D parameter estimation, which is operated in a main control chip, the object being a pedestrian or a cyclist;

training a multimodal superpixel dual-branch network with the 3D pseudo-labeling bounding boxes as labels and the 2D RGB image and 3D point cloud as inputs in the main control chip; and acquiring a 2D RGB image of a current frame shot by the camera and a 3D point cloud of a current scenario acquired by the vehicle LiDAR sensor, and inputting the 2D RGB image of the current frame and the 3D point cloud of the current scenario to the trained multimodal superpixel dual-branch network to generate a 3D object prediction bounding box of the current scenario, wherein the 3D object prediction bounding box is configured to localize the object around a vehicle, and predict a size and an orientation of the object around the current vehicle;

wherein the training a multimodal superpixel dual-branch network with the 3D pseudo-labeling bounding boxes as labels and 2D RGB image and the 3D point cloud as inputs for generating a trained multimodal superpixel dual-branch network specifically comprises:

corresponding 2D local pixel blocks to 3D points spatially with a local consistency priori to generate a projection relationship;

extracting an image feature map of the 2D RGB image with ResNet50, and upsampling the image feature map to the same size of an input image, the input image being the 2D RGB image;

performing superpixel segmentation on the input image, and obtaining superpixel features by pooling the image feature map according to a superpixel segmentation result;

assigning the superpixel features to the 3D points according to the projection relationship;

applying separately 3D convolution for 3D point cloud with initial geometric features and 3D point cloud with superpixel features, and projecting the point cloud features to BEV generating a BEV feature map;

fusing 3D point cloud features generated by the initial geometric features and superpixel features in the BEV feature map to generate a fused feature; and training the multimodal superpixel dual-branch network with the fused feature as an object classification feature to generate the trained multimodal superpixel dual-branch network.

2. The multimodal weakly-supervised 3D object detection method according to claim 1, wherein the generating a 3D pseudo-labeling bounding box of an object according to the region with the most 3D points in the filtered 3D frustum based on density-based 3D parameter estimation, which is operated in a main control chip, specifically comprises:

filtering an adhesive noise point cloud in the region with the most 3D points to generate a filtered 3D point cloud;

iteratively searching a bird's eye view (BEV) rotating box of the filtered 3D point cloud, progressively deleting a point with minimum density in the filtered 3D point cloud, and exiting iteration once a position of a key point is kept unchanged, thereby generating the BEV rotating box of the filtered 3D point cloud, wherein the key point is an angular point comprising most 3D points among four angular points of the rotating box; and expanding the key point to two sides of the filtered 3D frustum, constricting an expansion length with statistical information of the object, and generating the 3D pseudo-labeling bounding box with a vector direction of a long side as an orientation of the object.

3. The multimodal weakly-supervised 3D object detection method according to claim 1, further comprising:

training the multimodal superpixel dual-branch network by randomly abandoning the superpixel features, and padding abandoned superpixel features with 0.

4. A multimodal weakly-supervised three-dimensional (3D) object detection system, comprising:

a 3D frustum generation module configured to shoot multiple two-dimensional (2D) red, green and blue (RGB) images with a camera, acquire 3D point cloud by a vehicle LiDAR sensor, and generate a 3D frustum based on 2D box labels on each of the 2D RGB images;

a filtration module configured to filter ground points in the 3D frustum, and select a region with most 3D points in a filtered 3D frustum based on seeded region growing (SRG);

a 3D pseudo-labeling bounding box generation module configured to generate a 3D pseudo-labeling bounding box of an object according to the region with the most 3D points in the filtered 3D frustum based on density-based 3D parameter estimation, which is operated in a main control chip, the object being a pedestrian or a cyclist;

a training module configured to train a multimodal superpixel dual-branch network with the 3D pseudo-labeling bounding boxes as labels and the 2D RGB image and the 3D point cloud as inputs in the main control chip; and a detection module configured to acquire a 2D RGB image of a current frame shot by the camera and a 3D point cloud of a current scenario acquired by the vehicle LiDAR sensor, and input the 2D RGB image of the current frame and the 3D point cloud of the current scenario to the trained multimodal superpixel dual-branch network to generate a 3D object prediction bounding box of the current scenario, wherein the 3D object prediction bounding box is configured to localize the object around a vehicle, and predict a size and an orientation of the object around the current vehicle; wherein the training module specifically comprises:

a projection relationship generation unit configured to correspond 2D local pixel blocks to 3D points spatially with a local consistency priori to generate a projection relationship;

an upsampling unit configured to extract an image feature map of the 2D RGB image with ResNet50, and upsample the image feature map to the same size of an input image, the input image being the 2D RGB image;

a superpixel feature obtaining unit configured to perform superpixel segmentation on the input image, and obtain superpixel features by pooling on the image feature map according to a superpixel segmentation result;

an assignment unit configured to assign the superpixel features to the 3D points according to the projection relationship;

a projection unit configured to apply separately 3D convolution for 3D point cloud with initial geometric features and 3D point cloud with superpixel features, and project the 3D point cloud features to BEV generating a BEV feature map;

a fused feature generation unit configured to fuse point cloud features generated by initial geometric features and superpixel features in the BEV feature map to generate a fused feature; and a trained multimodal superpixel dual-branch network generation unit configured to train the multimodal superpixel dual-branch network with the fused feature as an object classification feature to generate the trained multimodal superpixel dual-branch network.

5. The multimodal weakly-supervised 3D object detection system according to claim 4, wherein the 3D pseudo-labeling bounding box generation module specifically comprises:

a filtration unit configured to filter an adhesive noise point cloud in the region with the most 3D points to generate a filtered 3D point cloud;

a bird's eye view (BEV) rotating box generation unit configured to iteratively search a BEV rotating box of the filtered 3D point cloud, progressively delete a point with minimum density in the filtered 3D point cloud, and exit iteration once a position of a key point is kept unchanged, thereby generating the BEV rotating box of the filtered 3D point cloud, wherein the key point is an angular point comprising most 3D points among four angular points of the rotating box; and a 3D pseudo-labeling bounding box generation unit configured to expand the key point to two sides of the filtered 3D frustum, constrict an expansion length with statistical information of the object, and generate the 3D pseudo-labeling bounding box with a vector direction of a long side as an orientation of the object.

6. The multimodal weakly-supervised 3D object detection system according to claim 4, further comprising:

a random superpixel feature abandonment module configured to train the multimodal superpixel dual-branch network by randomly abandoning the superpixel features, and pad abandoned superpixel features with 0.

7. An electronic device, comprising a memory and a processor, wherein the memory is configured to store a computer program, and the processor runs the computer program to enable the electronic device to execute the multimodal weakly-supervised three-dimensional (3D) object detection method according to claim 1.

8. The electronic device according to claim 7, wherein the generating a 3D pseudo-labeling bounding box of an object according to the region with the most 3D points in the filtered 3D frustum based on density-based 3D parameter estimation, which is operated in a main control chip, specifically comprises:

filtering an adhesive noise point cloud in the region with the most 3D points to generate a filtered 3D point cloud;

iteratively searching a bird's eye view (BEV) rotating box of the filtered 3D point cloud, progressively deleting a point with minimum density in the filtered 3D point cloud, and exiting iteration once a position of a key point is kept unchanged, thereby generating the BEV rotating box of the filtered 3D point cloud, wherein the key point is an angular point comprising most 3D points among four angular points of the rotating box; and expanding the key point to two sides of the filtered 3D frustum, constricting an expansion length with statistical information of the object, and generating the 3D pseudo-labeling bounding box with a vector direction of a long side as an orientation of the object.

9. The electronic device according to claim 7, further comprising:

training the multimodal superpixel dual-branch network by randomly abandoning the superpixel features, and padding abandoned superpixel features with 0.

* * * * *